United States Patent [19]

Capurka et al.

[11] 4,086,894
[45] May 2, 1978

[54] ROTARY DIRECTION SENSOR FOR ENGINE IGNITION CONTROL

[75] Inventors: Zbynek Antonin Capurka, Glen Elyn; Robert J. Vargas, Arlington Heights, both of Ill.

[73] Assignee: Motorola, Inc., Schaumburg, Ill.

[21] Appl. No.: 702,656

[22] Filed: Jul. 6, 1976

[51] Int. Cl.² ............................................. F02P 11/00
[52] U.S. Cl. ............................ 123/148 S; 123/148 E; 340/271
[58] Field of Search ............ 123/148 E, 148 S, 117 R, 123/117 D; 340/271

[56] References Cited

U.S. PATENT DOCUMENTS

| | | | |
|---|---|---|---|
| 3,482,560 | 12/1969 | Höhne | 123/148 E |
| 3,613,654 | 10/1971 | Gilbert | 123/148 E |
| 3,728,565 | 4/1973 | O—Callaghan | 340/271 |
| 3,728,676 | 4/1973 | Brown | 340/271 |
| 3,739,759 | 6/1973 | Sleder | 123/148 S |
| 3,795,235 | 3/1974 | Donohue et al. | 123/148 S |
| 3,824,972 | 7/1974 | Sattler | 123/117 R |
| 3,827,024 | 7/1974 | Anderson et al. | 340/271 |
| 3,830,207 | 8/1974 | Joseph | 123/117 D |
| 3,868,938 | 3/1975 | Trass | 123/148 E |
| 3,896,780 | 7/1975 | Kondo | 123/148 E |
| 3,955,549 | 5/1976 | Burson | 123/148 S |
| 3,990,417 | 11/1976 | Tershak | 123/117 R |
| 4,014,309 | 3/1977 | Nagasawa | 123/148 S |

*Primary Examiner*—Charles J. Myhre
*Assistant Examiner*—Andrew M. Dolinar
*Attorney, Agent, or Firm*—James W. Gillman; Phillip H. Melamed

[57] ABSTRACT

A rotary direction sensor used in conjunction with an engine spark ignition system is disclosed. Two sensors are used to sense the rotational position of a rotary body which is being synchronously rotated by the crankshaft of an internal combustion engine. Output signals of the sensors are compared by a logic circuit which produces ignition spark timing signals in response to the rotation of the rotary body in a predetermined direction. These spark timing signals are subsequently used to trigger SCRs which apply a high voltage across an ignition coil and thereby cause an ignition spark in a cylinder of the internal combustion engine. The sensors, the rotary body and the logic circuit are constructed so that engine spark timing signals are only produced for the internal combustion engine when the rotary body is rotated in a given rotary direction. Thus the generation of cylinder spark ignitions when the engine is being rotated in a reverse direction is inhibited. The direction of rotation of the rotary body is sensed by the logic circuit comparing the logic state of the signal produced by one of the sensors with the polarity of a logic state transition of the signal produced by the other sensor. Thus spark timing control signals are produced in response to the coincidence of a predetermined logic state of one sensor signal with a predetermined polarity transition of another sensor signal.

13 Claims, 12 Drawing Figures

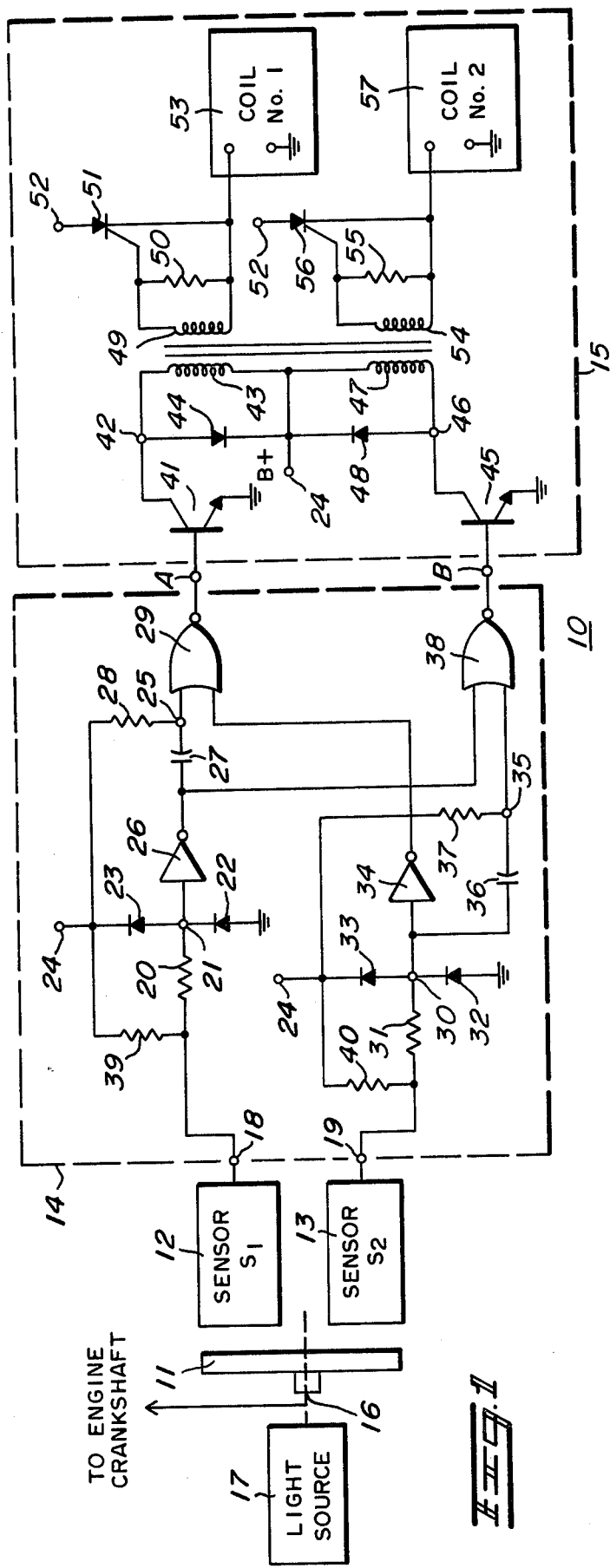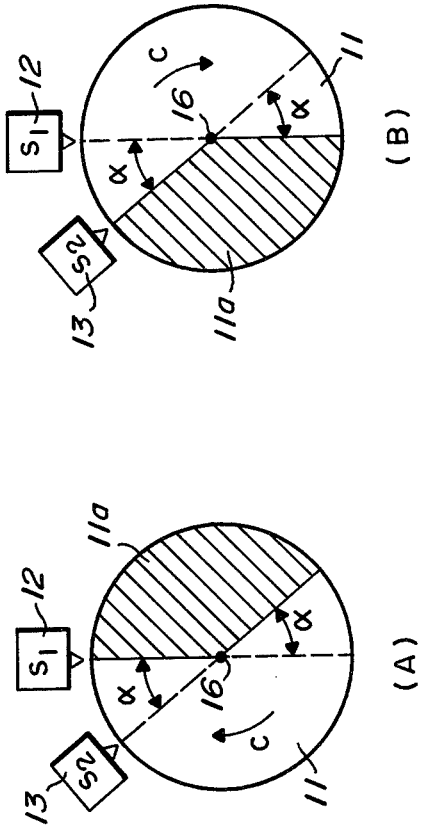

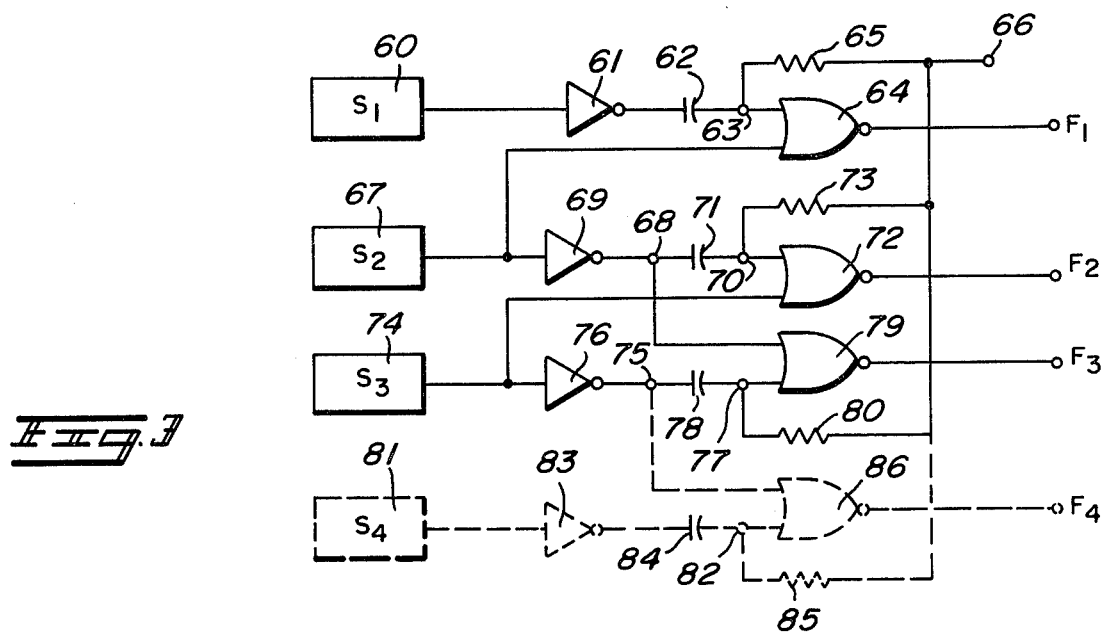
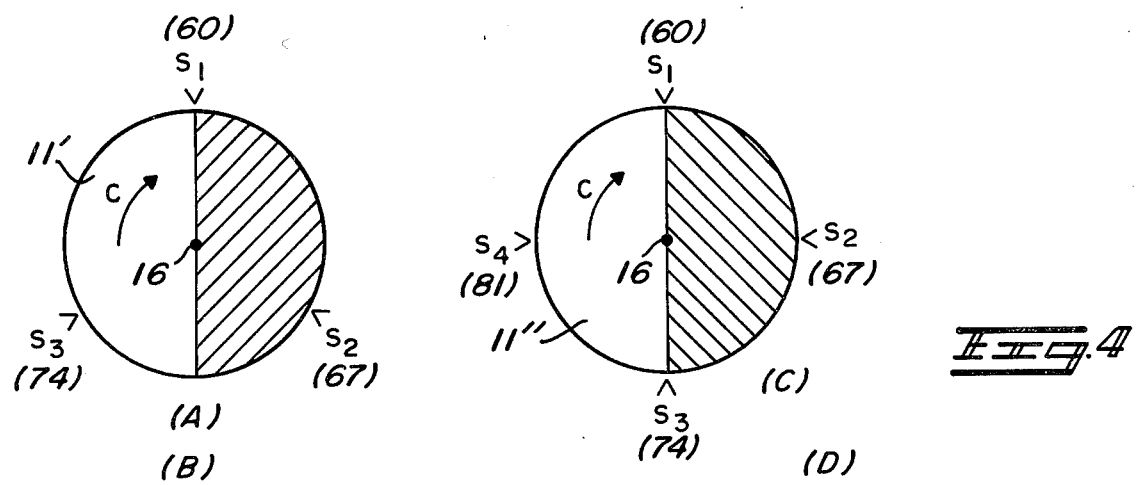
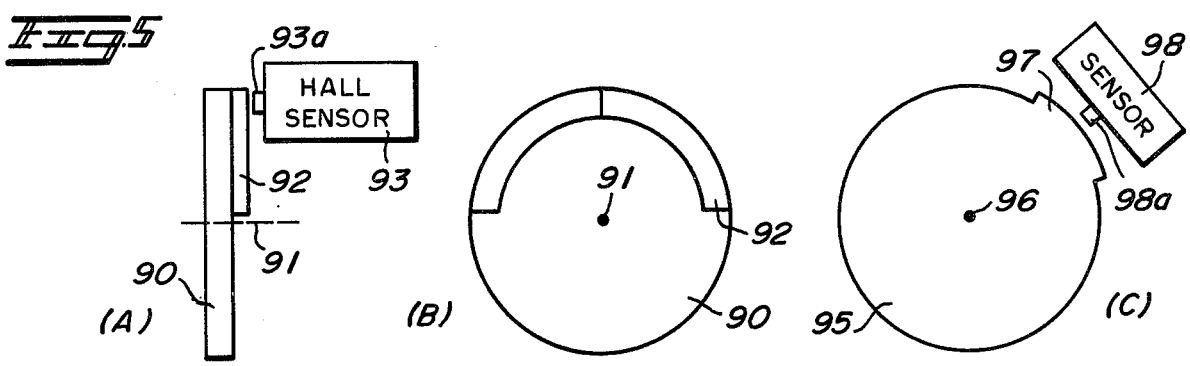

ROTARY DIRECTION SENSOR FOR ENGINE IGNITION CONTROL

BACKGROUND OF THE INVENTION

The invention relates generally to the field of rotary direction sensors and more particularly to the use of such sensors for controlling the creation of spark ignitions in the ignition system of an internal combustion engine.

For internal combustion engines, sensors are generally used to produce a spark timing signal which causes cylinder ignitions to occur at predetermined positions of the cylinder compression cycle. These sensors are normally either photosensitive devices, magnetic pick-up devices, Hall sensors or simple contacts which generally sense the rotational position of a rotary body which is synchronously rotated by the crankshaft of the engine.

Previous engine ignition systems generated spark timing signals solely in response to the rotational position of the rotary body and these systems did not prevent the generation of a spark ignition if the engine happened to be running in a reverse direction. Such a condition can easily occur in the two, three and four cylinder engines which are commonly used for marine outboard motors (two cycle engines). The occurrence of an ignition spark while the engine is rotating in a reverse mode can result in damage to the engine and carburetor. In addition, the general performance of an engine running in the reverse direction will be unsatisfactory. Therefore the prevention of spark ignitions when the engine is rotating in a reverse direction is a desirable result which the previous engine ignition systems have not produced. Previous systems have disregarded the problem and provided no apparatus for sensing the rotary direction of the rotating body which produces the ignition spark timing signals.

SUMMARY OF THE INVENTION

An object of the present invention is to provide an improved rotary direction sensor for determining when a body is being rotated in a desired rotary direction.

Another object of the present invention is to provide an improved rotary direction sensor which is adaptable for use in controlling the creation of spark ignitions for an internal combustion engine.

A more specific object of the invention is to provide an improved rotary direction sensor which determines the direction of rotation of a body by comparing the logic state of one sensor signal with the polarity of a logic state transition of another sensor signal.

A further object of the present invention is to provide an improved engine spark ignition system which senses the rotational direction of the engine and produces spark ignitions only when the engine is being rotated in a given rotary direction.

In one embodiment of the present invention, there is provided an improved rotary direction sensor. This rotary direction sensor basically comprises: a rotary body means rotatable about an axis; at least a first and second sensor means located about the axis, each of the sensor means producing a separate sensor signal having logic states which correspond to the rotational positions of the rotary body, the logic states of the sensor signals having transitions therebetween; and logic circuitry coupled to the first and second sensors for receiving the first and second sensor signals and producing control signals which indicate the direction of rotation of the rotary body.

The logic circuitry is stated to include circuits for comparing the logic states of one of the sensor signals with the logic state transitions of the other of the sensor signals, whereby a control signal which indicates that the rotary body is being rotated in a first rotary direction is created in response to the coincidence of a predetermined logic state of one sensor signal and a logic state transition of the other sensor signal which has a predetermined polarity.

Basically, the present invention is concerned with detecting the direction of rotation of a rotary body which is being synchronously rotated by the crankshaft of an engine. The generation of spark ignition signals for the engine is then controlled in response to the determination that the rotary body is being rotated in a predetermined preferred rotary direction. Thus the occurrence of cylinder ignitions when the engine is being reversely rotated is prevented. The specific construction of a suitable rotary direction detector corresponds to that of the rotary direction sensor described in the previous paragraph.

BRIEF DESCRIPTION OF THE DRAWINGS

For more complete understanding of the invention, reference should be made to the drawings, in which:

FIG. 1 is a combination block and schematic diagram illustrating an improved engine spark ignition system having a rotary direction sensor;

FIGS. 2A and 2B are schematic representative planar views illustrating the positioning of components which comprise the rotary direction sensor illustrated in FIG. 1;

FIG. 2C is a logic chart illustrating the operation of the rotary direction sensor shown in FIG. 1;

FIG. 3 is a combination block and schematic diagram of logic circuitry which is adaptable for three and four cylinder engine ignition systems embodying the present invention;

FIGS. 4A–4D are schematic representative planar views and logic charts illustrating the operation of the logic circuitry shown in FIG. 3; and FIGS. 5A, 5B and 5C are side and front face views of preferred embodiments of the rotary direction sensor illustrated in FIG. 1.

DESCRIPTION OF THE PREFERRED EMBODIMENT

FIG. 1 illustrates a two cylinder engine spark ignition system 10 having rotary direction sensor apparatus which detects the rotational directional of an engine (not shown) and produces spark timing ignition pulses for the engine in response to the engine being rotated in a predetermined preferred rotary direction. Cylinder spark ignitions are prevented by the system 10 when the engine is being rotated in a direction which is reverse to the preferred rotary direction.

The ignition system 10 basically comprises a rotary body 11, a first sensor 12 ($S_1$) and a second sensor 13 ($S_2$) which sense the rotational positions of the rotary body, a logic circuit 14 (shown dashed) which compares the output signals produced by the sensors 12 and 13 and spark ignition generating apparatus 15 (shown dashed) which receives control signals from the logic circuit 14 and produces engine cylinder ignitions in response thereto. Basically, the rotary body 11, the sensors 12 and 13 and the logic circuit 14 form a rotary direction sensor which produces control signals that are coupled to the spark generating apparatus 15 and control the generation of cylinder ignitions such that engine spark ignitions are produced only when the engine is running in a given direction.

The rotary body 11 is a wheel which is rotatable about an axis 16 and is synchronously rotated about this axis by the crankshaft of the engine. A light source 17 is positioned on one side of the rotary body 11 and sensors 12 and 13 are positioned on the other side of the rotary body 11. The wheel 11 has portions which have substantially opposite optical characteristics. The sensors 12 and 13 are contemplated as comprising photosensitive transistors which are located at stationary positions about the axis 16 and which have a fixed predetermined angular distance between them with respect to the axis.

The sensors 12 and 13 produce separate sensor output signals at terminals 18 and 19, respectively. These output signals alternate between logic states which correspond to the rotational positions of the rotary body 11. This is accomplished by the rotary wheel 11 alternately presenting, as it is rotated, a visual path between the light source 17 and the sensors 12 and 13. Thus since the sensors 12 and 13 include phototransistors, the output signals at terminals 18 and 19 corresponds to logic states that are related to the saturation and cutoff of the phototransistors which are activated in response to the rotational positions of the rotary body 11. The sensor output signals vary between two separate logic states and have positive and negative transitions (leading and trailing edges) between these logic states corresponding to the turning on and turning off of the photosensitive transistors.

While the ignition system 10 illustrates an optical apparatus for producing the sensor signals at terminals 18 and 19, the present invention is not limited to such apparatus and the use of magnetic pick-up sensors and Hall sensors is within the scope of the present invention. FIGS. 5A-5C illustrate how Hall sensors can be used to produce the sensor output signals at terminals 18 and 19 and these figures will be discussed more fully subsequently.

The logic circuit 14 basically receives the sensor output signals present at terminals 18 and 19 and produces control signals which indicate the direction of rotation of the rotary body 11. Since the rotary body 11 is rotated in synchronization with the crankshaft of the engine, these control signals indicate the direction of rotation of the engine. The logic circuit 14 functions by comparing the logic state of one sensor signal with the logic state transitions of the other sensor signal. When a predetermined logic state of one sensor signal is found to correspond to a logic state transition of the other sensor signal which has a predetermined polarity, then a control signal is created which indicates that the rotary body is being rotated in a preferred rotary direction.

The logic circuit 14 receives the signal present at the terminal 18 and couples this signal through a resistor 20 to an internal terminal 21. A diode 22 is coupled between ground and the terminal 21 and has its anode connected directly to ground. A diode 23 is coupled between terminal 21 and a positive voltage supply terminal 24 and the diode 23 has its cathode directly connected to terminal 24. The terminal 21 is coupled to a terminal 25 by an inverter 26 followed by a capacitor 27. The terminal 25 is coupled to the terminal 24 by a resistor 28 and terminal 25 is coupled as an input to a NOR gate 29 which has its output connected to an output terminal A. The sensor signal at terminal 19 is coupled to an internal terminal 30 through a resistor 31. The terminal 30 has diodes 32 and 33 coupled between ground and the terminal 24, respectively, and connected in an identical manner to diodes 22 and 23. The terminal 30 is coupled to the NOR gate 29 by an inverter 34 which inverts signals present at terminal 30 and provides these inverted signals as an input to the NOR gate 29. The terminal 30 is also coupled to a terminal 35 by a capacitor 36, the terminal 35 being directly connected to the terminal 24 by a resistor 37 and directly connected as an input to a NOR gate 38. The output of the inverter 26 is coupled as another input to the NOR gate 38 which has its output directly connected to a terminal B. Resistors 39 and 40 are coupled between the terminal 24 and output sensor terminals 18 and 19, respectively. The components 20 through 40 comprise the logic circuit 14 whose operation will now be discussed.

The diodes 22, 23, 32 and 33 generally serve to limit any large transient voltages which may occur at the terminals 21 and 30. The resistors 39 and 40 are used to provide load impedances for the sensors S1 and S2 and positive potentials at the terminals 21 and 30 in the absence of any signals at the terminals 18 and 19, respectively. The resistors 28 and 37 provide positive potentials to the terminals 25 and 35, respectively. By maintaining the terminals 25 and 35 at a positive potential, positive going logic state transitions which occur at the other side of the capacitors 27 and 36 are prevented from changing the logic inputs to the NOR gates 29 and 38. However, negative logic state transitions will be passed by the capacitors 27 and 36 and result in negative logic state pulses occurring at the terminals 25 and 35, respectively. These negative logic pulses will change the logic inputs to the NOR gates 29 and 38.

The NOR gate 29 basically monitors the inverse of the logic signal present at the terminal 19 and the positive logic state transitions of the signal present at the terminal 18. Only when a positive logic state at the terminal 19 coincides with the occurrence of a positive logic state transition at the terminal 18 will the NOR gate 29 produce a positive logic state at the terminal A. The duration of this positive logic state is controlled by the charging up of the capacitor 27 through the resistor 28, but the occurrence of this logic state is determined by the aforementioned conditions. No other combination of logic states or logic state transitions will result in the production of a positive logic state at the terminal A.

Similarly, the NOR gate 38 monitors the inverse of the logic signals present at the terminal 18 and the logic state transitions present at the terminal 19. Thus NOR gate 38 will produce a positive logic state at the terminal B only when a positive logic state exists at the terminal 18 and a negative logic state transition coincidentally exists at the terminal 19.

Thus the signals present at the terminals A and B, which serve as control signals for the ignition spark generating apparatus 15, are created only in response to the occurrence of a logic state of one of the sensors along with a logic state transition of a predetermined polarity in the output signal of the other sensor. By producing control signals which are responsive to the polarity of the logic state transitions, the rotational direction of the rotary body 11 is sensed and control signals are produced which indicate in which direction the rotary body is being rotated. This fact is more clearly illustrated with reference to FIGS. 2A-2C which will be discussed subsequently.

The spark generation apparatus 15 is responsive to the creation of positive logic states at the terminals A and B and generates engine spark ignitions in response thereto. The terminal A is coupled to the base of an NPN transistor 41 which has its emitter connected directly to ground and its collector connected to an end terminal 42 of a transformer winding 43 that has its other end terminal directly connected to the power supply terminal 24. A diode 44 is coupled between terminals 42 and 24 for transient suppression and has its cathode directly connected to terminal 24. The terminal B is directly coupled to the base of an NPN transistor 45 which has its emitter directly connected to ground and its cathode coupled to an end terminal 46 of a transformer winding 47 which has its other end terminal directly connected to the terminal 24. A transient suppression diode 48 is coupled between terminals 46 and 24 and has its cathode directly connected to terminal 24.

A transformer winding 49 is positioned adjacent to the winding 43 and has signals induced therein by this winding. A resistor 50 is coupled across the winding 49 and also coupled across the gate and cathode electrodes of an SCR 51 which has its anode connected to a high voltage supply terminal 52. The cathode of the SCR 51 is directly coupled to a spark coil 53 which generates the ignition spark for one engine cylinder.

A transformer winding 54 is positioned adjacent to the winding 47 and has signals induced in it by this winding. A resistor 55 is coupled across the winding 54 and is coupled across the gate and cathode terminals of an SCR 56 which has its anode connected to the high voltage supply terminal 52. The cathode of the SCR 56 is coupled to a spark ignition coil 57 which generates the ignition spark for another cylinder of the engine. The components 41 through 54 generally comprise the engine spark generation apparatus 15 which produces cylinder ignition sparks in response to the direction indicating control signals produced by the logic circuit 14.

The operation of the spark generating apparatus 15 will now be briefly described. When a positive logic state is created at the terminal A, the transistor 41 will be turned on and saturated for a duration equal to the duration of the positive logic state. The saturation of the transistor 41 will create a current through the transformer winding 43 which will induce a voltage across the winding 49 that results in applying a positive potential between the gate and cathode terminals of the SCR 51. The occurrence of a positive potential across these terminals will trigger the SCR into a conducting mode and effectively short the high voltage supply terminal 52 to the ignition coil 53. This will create an ignition spark in a manner which is well known to those of average skill in the art. Thus the occurrence of a positive logic control state at the terminal A will result in triggering the SCR 51 and creating an ignition spark in a cylinder. Similarly, the creation of a positive logic state at the terminal B will trigger the SCR 56 and result in a cylinder ignition spark being created by the ignition coil 57. Since the positive logic states at the terminals A and B are only created when the rotary body 11 is being rotated in a predetermined rotary direction, the engine spark ignitions will be produced only when the engine is being run in a desired rotary direction. Thus the reverse running of the engine has been effectively prevented and the occurrence of any cylinder spark ignitions when the engine is being rotated in a reverse direction has also been prevented.

FIGS. 2A and 2B illustrate one embodiment of the rotary wheel 11 which can be used with an optical rotary direction sensor. The preferred rotary direction of the wheel 11 is illustrated by an arrow C. The sensors 12 and 13 are generally indicated as being disposed about the axis 16 and having a fixed angular distance $a°$ between them. The rotary wheel 11 is illustrated as having a clear, transparent, portion which exits over $180° + a°$ of its surface. A shaded, opaque, portion 11a is illustrated as comprising $180° - a°$ of the surface of the rotary wheel 11.

FIG. 2A illustrates the position of the rotary wheel 11 just as the sensor 12 would be undergoing a positive, opaque to transparent, logic state transition. FIG. 2B illustrates the position of the rotary wheel 11 just as the sensor 13 is detecting a negative, transparent to opaque, logic state transition. FIG. 2C is a chart which tabulates the logic states produced in response to the rotary positions illustrated in FIGS. 2A and 2B and correlates these logic states and transitions with the resultant logic states produced at the terminals A and B.

Thus FIGS. 2A-2C illustrate an optical embodiment of the rotary wheel 11 which will insure that spark ignitions for the engine are created only when the rotary body 11 is rotated in the direction C. If the rotary body 11 is rotated in the opposite direction, positive logic states will never be produced at the terminals A and B and no engine spark ignitions will be generated by the apparatus 15.

The present invention has therefore provided an engine rotation direction sensor which generates control signals that indicate the direction of rotation of the engine and control the generation of cylinder spark ignitions. The sensors 12 and 13 also provide cylinder spark timing information which is related to the precise rotational position of the rotary body 11. The occurrence of a logic state transition at terminals 18 and 19 signifies a precise rotational position for the rotary body 11. Since the body 11 is rotated in synchronization with the engine crankshaft, this transition also signals a precise cycle position for the cylinders of the engine. Thus the spark generating appartus 15 produces a cylinder spark ignition in response to the occurrence of a logic state transition of the signals produced by the sensors. While prior ignition systems have used sensors to determine the rotational position of the crankshaft of the engine and provide spark timing information, the present invention also uses the sensors to determine the direction of rotation of the engine crankshaft. Thus in the present invention, the sensors not only provide spark timing information, but also sense the direction of rotation of the engine crankshaft.

FIG. 3 illustrates sensors and simplified logic circuitry which can be used to implement the present invention and provide rotation sensing control voltages for a three and four cylinder engine. Circuitry suitable for a three cylinder is illustrated by the solid components shown in FIG. 3 and the addition of the phantom components shown in FIG. 3 will result in suitable circuitry for a four cylinder engine. FIG. 3 therefore illustrates how to adapt the present invention to internal combustion engines having more than two cylinders.

Referring to FIG. 3, a first sensor 60 ($S_1$) produces output signals which are coupled through an inverter 61 and a capacitor 62 to an input terminal 63 which serves as an input for a NOR gate 64. A resistor 65 is coupled between the terminal 63 and a B+ terminal 66 and insures that the NOR gate 64 will only be responsive to negative transitions which occur at the terminal 63. These negative transitions correspond to positive logic state transitions created by the sensor 60. The output of the NOR gate 64 is designated as $F_1$. A second sensor 67 ($S_2$) is directly coupled to the NOR gate 64 and produces logic state output signals which serve as input signals to the NOR gate. The output signals of sensor 67 are also coupled to a terminal 68 by an inverter 69. The terminal 68 is coupled to a terminal 70 by a capacitor 71 and the terminal 70 serves as an input to a NOR gate 72. A resistor 73 is coupled between the terminals 70 and 66 and performs substantially the same function as resistor 65. A third sensor 74 ($S_3$) has its output directly coupled as an input to the NOR gate 72. The output of the sensor 74 is also coupled to a terminal 75 through an inverter 76 and the terminal 75 is coupled to a terminal 77 by a capacitor 78. The terminal 77 is directly coupled as an input to a NOR gate 79 and has a resistor 80 coupled between it and the positive supply terminal 66. The terminal 68 is directly coupled as another input to the NOR gate 79. The outputs of the NOR gates 72 and 79 are designated as $F_2$ and $F_3$. The components 60 through 80 generally form a sensor and logic circuit arrangement necessary to produce a three cylinder engine ignition system similar to the two cylinder ignition system 10 shown in FIG. 1.

The positioning of the three sensors 60, 67 and 74 with respect to a rotating optical wheel 11' is illustrated in FIG. 4A. FIG. 4B illustrates the resultant logic states created by such an arrangement.

Referring now to FIG. 4A, an optical rotating body 11' is illustrated rotatable about the axis 16. The preferred direction of rotation is clockwise and this is indicated by the arrow C. The sensors 60, 67 and 74 are illustrated as being equally disposed about the axis 16 and having angular distances of 120° therebetween. The optical wheel 11' is illustrated as comprising a transparent portion which extends over 180° of the wheel surface and an opaque (shaded) portion which extends over the other 180° of the wheel surface.

FIG. 4B is a chart which illustrates the resultant logic states created by the logic circuitry illustrated in FIG. 3 when disposed as illustrated in FIG. 4A and the optical wheel 11' is rotated in the direction C. The FIG. 4B chart illustrates that a positive logic state transition detected by sensor 60 which coincides with a zero logic state detected by sensor 67 will produce a positive logic pulse at $F_1$. For sensor output signals, a zero logic state (0) corresponds to no light being detected by a sensor and a positive logic state (1) corresponds to a detection of light by a sensor. The logic state present at the output of sensor 74 is immaterial to the production of a positive logic state at $F_1$ and the immateriality of this logic state is indicated by a dash in the chart 4B. Similarly, positive logic states at $F_2$ and $F_3$ are produced by the coincidence of a predetermined logic state produced by one sensor and a logic state transition having a predetermined polarity produced by another sensor.

Spacing the sensors in 120° increments about the axis 16 insures that three spark ignition signals will be produced for every rotation of the rotary wheel 11'. Thus the FIG. 3 circuitry and the wheel 11' are capable of producing direction sensitive spark timing signals for a three cylinder internal combustion engine.

Referring again to FIG. 3, a fourth sensor 81 ($S_4$) is illustrated in phantom and has its output coupled to a terminal 82 by an inverter 83 followed by a capacitor 84 (all shown in phantom). The terminal 82 is coupled to the B+ terminal 66 by a resistor 85 (shown in phantom) and the terminal 82 serves as an input terminal for a NOR gate 86 (shown in phantom). Terminal 75 is connected in phantom as another input to the NOR gate 86 and the output of the NOR gate is designated by $F_4$.

FIG. 4C illustrates the positioning of the four sensors 60, 67, 74 and 81 about the axis 16 of an optical wheel 11" which is used to generate spark timing signals for a four cylinder engine. The sensors are equally disposed about the axis in 90° increments and the preferred rotational direction of the optical wheel 11" is clockwise and is illustrated by the arrow C. The optical wheel again comprises a clear portion over 180° of its surface and a shaded or opaque portion over the other 180° of its surface.

FIG. 4D illustrates the creation of the spark timing signals $F_1$–$F_4$ by all of the components illustrated in FIG. 3 and the optical wheel 11" and sensor placement illustrated in FIG. 4C. FIG. 4D uses the identical logic state terminology that was used in charts 4B and 2C. Thus sensor locations and logic circuitry have been illustrated in FIGS. 3, 4C and 4D which will easily enable a person of average skill in the art to expand the two cylinder ignition system 10 illustrated in FIG. 1 to a four cylinder ignition system. In a similar manner, the present invention can be expanded to accommodate any number of cylinders.

FIGS. 5A, 5B and 5C illustrate preferred embodiments of a rotary wheel and sensor configuration which are readily adaptable for implementation in the present invention.

FIG. 5A illustrates a side view of a rotary body 90 rotatably mounted about an axis 91 and having a raised peripheral portion 92 which will pass adjacent to the active sensing area 93a of a Hall sensor 93 during the rotation of the body 90 about the axis 91. FIG. 5B illustrates a planar front view of the rotary body 90.

Hall sensors, such as sensor 93, produce logic state output signals in response to the positioning of metallic structures adjacent to the active sensing area of the Hall sensor. Such sensors are well known to those of average skill in the art and are readily available and adaptable for use in engine ignition systems. For engine ignition systems in which substantial termperature variations may be encountered, the use of a Hall sensor would be preferrable to the rotating optical wheel 11 used in combination with a light source and photosensitive sensors.

FIG. 5C illustrates a front planar view of a rotary wheel 95 rotatable about an axis 96 and having a raised portion 97 which is outwardly radially extending. A Hall sensor 98 is illustrated as having an active sensing area 98a positioned so that the rotation of the wheel 95 results in passing the portion 97 adjacent to the sensing area 98a. Thus FIG. 5C illustrates another practical sensor configuration.

While I have shown and described specific embodiments of this invention, further modifications and improvements will occur to those skilled in the art. All such modifications which retain the basic underlying principles disclosed and

We claim:

1. An engine spark ignition system having a rotation sensor for controlling the creation of spark ignitions, comprising:
    rotary body means synchronously rotatable by an engine crankshaft about an axis;
    at least a first and second sensor means each producing a separate sensor signal having logic states directly corresponding to the rotational positions of said rotary body, said logic states having transitions therebetween;
    logic circuitry means coupled to said first and second sensors for receiving said first and second sensor signals and producing a control signal with transitions which indicates that said rotary body is being rotated in a first rotary direction, wherein each coincidence of a predetermined logic state of said first sensor signal with transitions of only a predetermined polarity of said second sensor signal produces transitions in said control signal; and
    means coupled to said logic circuitry means for receiving said control signal and producing spark ignitions for said engine in response to the production of said control signal transitions by said predetermined polarity transitions of said second sensor signal,
    wherein engine spark ignitions are produced only when said rotary body is being rotated in said first rotary direction.

2. An engine spark ignition system according to claim 1 which includes a light source and wherein said first and second sensors includes photosensitive devices.

3. An engine spark ignition system according to claim 2 wherein said rotary body has portions which have substantially opposite optical characteristics.

4. An engine spark ignition system according to claim 1 wherein said first and second sensors are Hall sensors.

5. An engine spark ignition system according to claim 4 wherein said rotary body is a wheel with raised portions, said wheel being positioned with respect to said sensors such that the raised portions of said wheel will pass adjacent to at least one of said sensors during the rotation of said rotary body.

6. An engine spark ignition system according to claim 5 wherein said sensors are located at stationary positions about said axis and have a predetermined angular distance between them with respect to said axis.

7. An engine spark ignition system according to claim 6 wherein said logic circuitry means includes circuitry for comparing the logic states of said first sensor signal with the transitions of said second sensor signal, whereby a first rotary direction of rotation of said rotary body is indicated by the coincidence of a first logic state of said first sensor signal with a predetermined polarity transition of said second sensor signal.

8. An engine spark ignition system according to claim 1 wherein said logic circuitry means includes a logic gate for comparing said first and second sensor signals and a capacitor for effectively coupling at least one polarity transition of said second sensor signal to said logic gate.

9. An engine spark ignition system according to claim 8 wherein said logic circuitry means includes additional circuitry coupled to said capacitor for substantially coupling transitions of only one polarity of said second sensor signal to said logic gate.

10. An engine spark ignition system according to claim 1 wherein said logic circuitry means also produces a second control signal with transitions which indicates that the rotary body is being rotated in said first rotary direction, and wherein each coincidence of a predetermined logic state of said second sensor signal with transitions of only a predetermined polarity of first first sensor signal produces transitions in said second control signal, and wherein said means for producing spark ignitons for said engine also receives said second control signal and produces spark ignitions in response to the production of said second control signal transitions produced by said predetermined polarity transitions of said first sensor signal.

11. An engine spark ignition system according to claim 10 wherein said means for producing spark ignitions for said engine includes separate ignition coils for receiving each of said control signals.

12. An engine spark ignition system according to claim 11 wherein said logic circuitry means includes separate logic gates each comparing said first and second sensor signals, and separate capacitors associated with each of said logic gates for effectively coupling at least one polarity transition of said first sensor signal to one of said logic gates and at least one polarity transition of said second sensor signal to the other of said logic gates.

13. An engine spark ignition system according to claim 12 wherein said logic circuitry means includes additional circuitry coupled to each of said capacitors for substantially coupling transitions of only one polarity of said first sensor signal to one of said logic gates and for substantially coupling transitions of only one polarity of said second sensor signal to the other of said logic gates.

* * * * *